US009583099B2

(12) United States Patent
McCandless et al.

(10) Patent No.: US 9,583,099 B2
(45) Date of Patent: Feb. 28, 2017

(54) METHOD AND SYSTEM FOR PERFORMING TERM ANALYSIS IN SOCIAL DATA

(71) Applicant: ORACLE INTERNATIONAL CORPORATION, Redwood Shores, CA (US)

(72) Inventors: Timothy P. McCandless, Boulder, CO (US); Mehrshad Setayesh, Lafayette, CO (US); Alexander Thomas Taujenis, Broomfield, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/527,697

(22) Filed: Oct. 29, 2014

(65) Prior Publication Data

US 2015/0120302 A1 Apr. 30, 2015

Related U.S. Application Data

(60) Provisional application No. 61/897,089, filed on Oct. 29, 2013.

(51) Int. Cl.

*G06F 17/27* (2006.01)
*G10L 15/18* (2013.01)
*G06F 3/0481* (2013.01)
*H04L 12/18* (2006.01)
*H04L 12/58* (2006.01)

(52) U.S. Cl.

CPC ........ *G10L 15/1815* (2013.01); *G06F 3/0481* (2013.01); *H04L 12/1813* (2013.01); *H04L 51/32* (2013.01)

(58) Field of Classification Search

CPC ........... G10L 2015/088; G10L 15/1815; G06F 17/30253; G06F 17/3087; G06F 17/278
USPC .............................................. 704/9, 10, 257
See application file for complete search history.

(56) References Cited

U.S. PATENT DOCUMENTS 7,383,172 B1 * 6/2008 Jamieson ............ G06F 17/2785 704/9
8,090,724 B1 * 1/2012 Welch ............... G06F 17/30616 707/750
8,245,135 B2 * 8/2012 Cai .................. G06F 17/30884 707/708
2003/0061200 A1 * 3/2003 Hubert .............. G06F 17/30011
2004/0162827 A1 * 8/2004 Nakano ............. G06F 17/30675
2004/0205448 A1 * 10/2004 Grefenstette ..... G06F 17/30867 715/230
2004/0225667 A1 * 11/2004 Hu .................... G06F 17/30719
2005/0108001 A1 * 5/2005 Aarskog ............... G06F 17/271 704/10
2007/0067157 A1 * 3/2007 Kaku .................. G06F 17/2775 704/10
2009/0112892 A1 * 4/2009 Cardie ............. G06F 17/30011
2011/0196670 A1 * 8/2011 Dang .................. G06F 17/2785 704/9

(Continued)

*Primary Examiner* — Jakieda Jackson
(74) *Attorney, Agent, or Firm* — Vista IP Law Group, LLP

(57) ABSTRACT

Disclosed is a system, method, and computer program product for allowing an entity to access social media data, and to perform term analysis upon that data. The approach is capable of accessing data across multiple types of internet-based sources of social data and commentary. A user interface is provided that allows the user to view and interact with the results of performing term analysis.

45 Claims, 18 Drawing Sheets

(56) References Cited

U.S. PATENT DOCUMENTS

| | | | | |
|---|---|---|---|---|
| 2013/0262442 | A1* | 10/2013 | Dennis | G06F 17/30696 707/722 |
| 2014/0074551 | A1 | 3/2014 | Setayesh et al. | |
| 2015/0089409 | A1* | 3/2015 | Asseily | G06Q 10/10 715/765 |
| 2015/0149448 | A1 | 5/2015 | Mccandless et al. | |
| 2015/0149463 | A1 | 5/2015 | Mccandless et al. | |
| 2016/0034445 | A1 | 2/2016 | Setayesh et al. | |
| 2016/0034560 | A1 | 2/2016 | Setayesh et al. | |
| 2016/0034571 | A1 | 2/2016 | Setayesh et al. | |
| 2016/0092551 | A1 | 3/2016 | Tang et al. | |

* cited by examiner

ORACLE SOCIAL RELATIONSHIP MANAGEMENT       Mail | Welcome back, Mehrshad Setayesh! | Help | Log Out Obama-Positive(12,561 Snippets) [09/18/2013-10/19/2013]

All Snippets | Themes | Terms

[EVERTHING] [ACTIONS] [DESCRIPTORS] [THINGS]

ahead alanjoelny american back clean close conservative constructive controversial diary diplomatic economic egyptian featured finally fiscal good great high historic indian interested iran iranian just last late liberal long many more more most most mutual respect new not now nuclear old partial political popular preferable ready short siren syrian top true 388 Snippets

J.C. PENNEY CONSIDERS RAISING FRESH CAPITAL    online.wsj.com
View Results>>[Most] Recommended Comments Comments Commenters 1. "The Obama Administration had to..." -Jonathan Murray 176 Recommendations 2. "Obama is getting all of the...". - Michael Selde
⚲ Positive
ID:1902514

BLOOMBERG (LINK ONLY) | OBAMA STRIPPED TO SKELETON STAFF IN A ...    freepublic.com
The humanity!!! 8 posted on 09/28/2013 12:04:54 PM PDT by berdie [Post Reply | Private Reply | To 1 | View Replies]
To: Qbert "Obama Strip to skeleton staff ...
⚲ Positive
ID:2186840

JOEL CONNELLY | NO-ON-I-522:SHOW US THE MONEY!!    blog.seattlepi.com
Christmas Tree National Day of Service National politics National Rifle Association NBC Neil Patrick Harris Nevada [New] York Times Newt Gingrich Newtown NOAA NRA Obama Obamacare Occupy movement Oregon Orrin Hatch Parks and Recreation Pat Robertson Patrick Murphy patriotic posters Paul Ryan Paula Broadwell PBS Pentagon Pet
⚲ Positive
ID:2404620

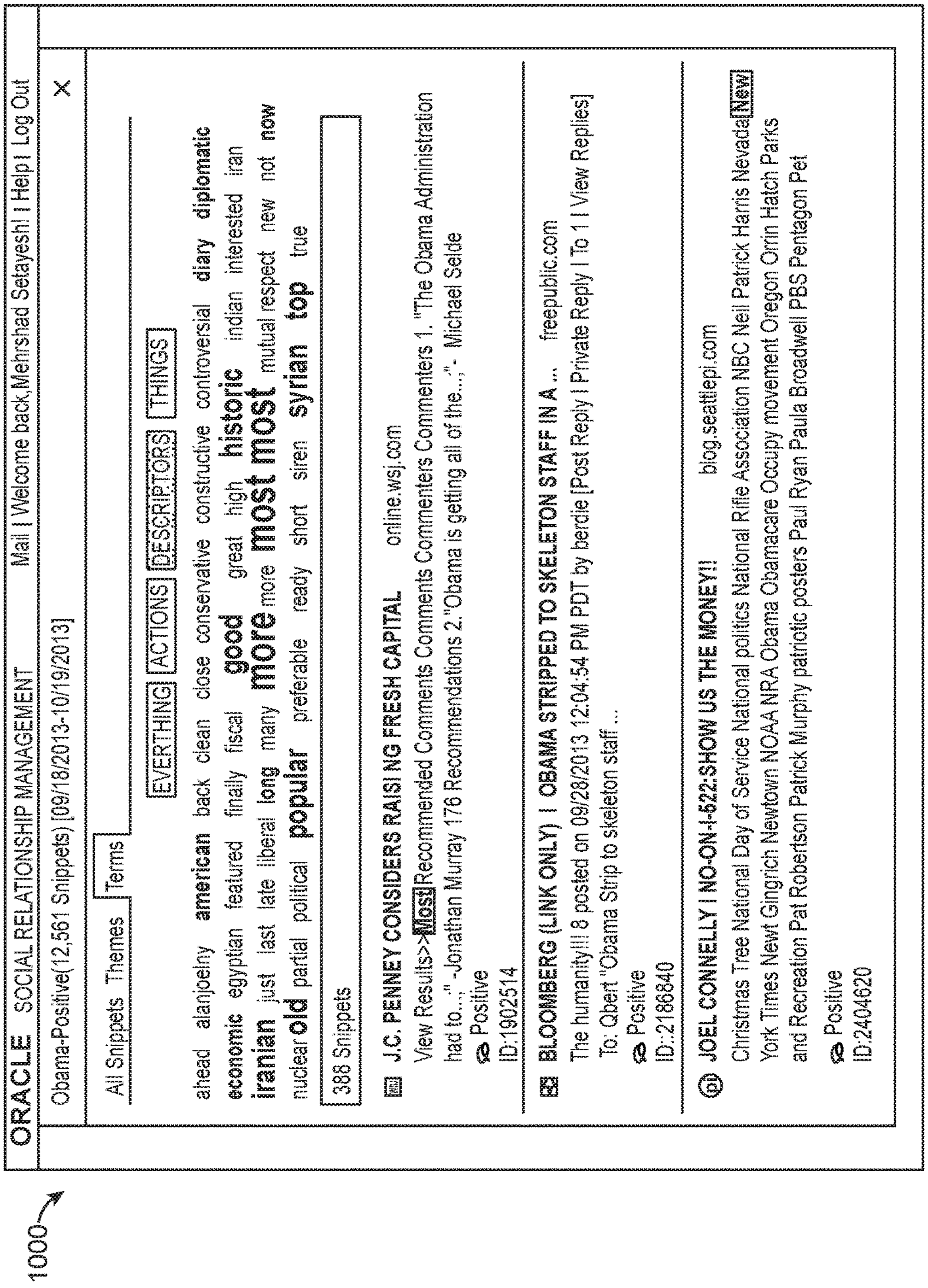

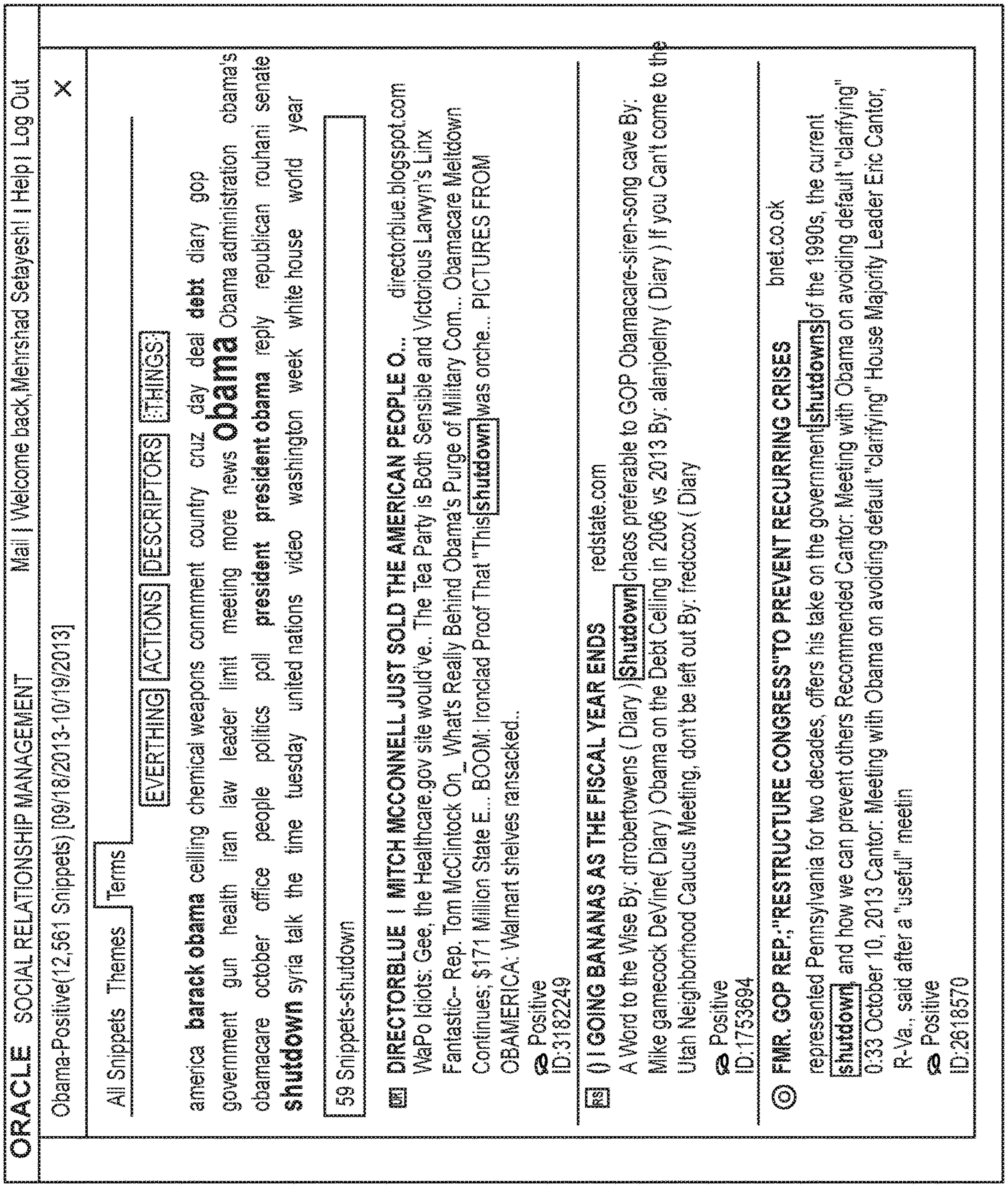

FIG. 11

ORACLE SOCIAL RELATIONSHIP MANAGEMENT    Mail | Welcome back,Mehrshad Setayeshi | Help | Log Out Obama-Positive(12,561 Snippets) [09/18/2013-10/19/2013]    X All Snippets | Terms

[EVERTHING] [ACTIONS] [DESCRIPTORS] [THINGS]

america barack obama ceililing chemical weapons commment country cruz day deal debt diary gop government gun health iran law leader limit meeting more news obama Obama administration obama's obamacare october office people politics poll president president obama reply republican rouhani senate shutdown syria talk the time tuesday united nations video washington week white house world year 59 Snippets-shutdown ▣ DIRECTORBLUE | MITCH MCCONNELL JUST SOLD THE AMERICAN PEOPLE O...    directorblue.blogspot.com
WaPo Idiots: Gee, the Healthcare.gov site would've.. The Tea Party is Both Sensible and Victorious Lawyn's Linx Fantastic-- Rep. Tom McClintock On_ What's Really Behind Obama's Purge of Military Com... Obamacare Meltdown Continues; $171 Million State E... BOOM: Ironclad Proof That "This [shutdown] was orche... PICTURES FROM OBAMERICA: Walmart shelves ransacked..
👍 Positive
ID:3182249

▣ () I GOING BANANAS AS THE FISCAL YEAR ENDS    [Shutdown]    redstate.com
A Word to the Wise By: drrobertowens ( Diary ) [Shutdown] chaos preferable to GOP Obamacare-siren-song cave By: Mike gamecock DeVine( Diary ) Obama on the Debt Ceiling in 2006 vs 2013 By: alanjoelny ( Diary ) If you Can't come to the Utah Neighborhood Caucus Meeting, don't be left out By: fredccox ( Diary
👍 Positive
ID:1753694

◉ FMR. GOP REP.; "RESTRUCTURE CONGRESS" TO PREVENT RECURRING CRISES    bnet.co.ok
represented Pennsylvania for two decades, offers his take on the government [shutdowns] of the 1990s, the current [shutdown], and how we can prevent others Recommended Cantor: Meeting with Obama on avoiding default "clarifying" 0:33 October 10, 2013 Cantor: Meeting with Obama on avoiding default "clarifying" House Majority Leader Eric Cantor, R-Va., said after a "useful" meetin
👍 Positive
ID:2618570

ORACLE SOCIAL RELATIONSHIP MANAGEMENT     Mail | Welcome back,Mehrshad Setayesh! | Help | Log Out    X Obama(French)(15,127 Snippets) [09/24/2013]

All Snippets | Themes | Terms

[ EVERTHING ] [ ACTIONS ] [ DESCRIPTORS ] [ THINGS ]

americain americaines annonuce appelle armes ayrault ban bettencourt cesser chance conséquences demiers diaporamas diplomatie dit donner democratie dependra egypte ferme finira fournir fumeur images insertion iran jacob jures l'info l'onu minutes obama parloir pays postes progres presentees prêt repenti requisition résolution soutien syrie tous veut viols verite eclater 259 Snippets- syrie ☐ WASHINGTON VA SIGNER LE TRAITÉ SUR LE COMMERCE DES ARMES CONVE... fr.news.yahoo.com/fe/egypte.html
suiv[Syrie] Obama veut une résolution "ferme" avec des "conséquences" Insertion: Ayrault annonce 1,000 postes de stagiaires[Syrie] Ban appelle tous les pays à cesser de fournir des armes Iran: Obama prêt à donner une chance à la diplomatie Egypte: le soutien américain dépendra des progrès vers la démocratie Viols au parloir: les images présentées aux jurés Derniers diaporamas 1 - 4 sur
🔗 ID:1798115

☐ LA SOMALIE, DE LA COLONISATION AUX SHEBAB    fr.news.yahoo.com/fe/tchetcherlie.html
30 préc suiv ONU: la présidente brésilienne dénonce les écoutes américaines Mort accidentelle d'un élève puni: pas de réquisition Bettencourt: la "verite" finira par "eclater", dit Jacob[Syrie] Obama veut une résolution "ferme" avec des "conséquences" Insertion:Ayrault annonce 1,000 postes de stagiaires[Syrie] Ban appelle tous les pays à cesser de fournir des armes Derniers diaporamas 1 -
🔗 ID:1803903

☐ SYRIE: OBAMA RÉCLAME UNE RÉSOLUTION "FERME" ASSORTIE DE "CONSÉ...    fr.news.yahoo.com/fc/maroc.html
30 préc suiv ONU: la présidente brésilienne dénonce les écoutes américaines Mort accidentelle d'un élève puni: pas de réquisition Bettencourt: la "verite" finira par "eclater", dit Jacob[Syrie]Obama veut une résolution "ferme" avec des "conséquences" Insertion: Ayrault annonce 1,000 postes de stagiaires[Syrie] Ban appelle tous les pays à cesser de fournir des armes Derniers diaporamas 1 -
🔗 ID:1813921

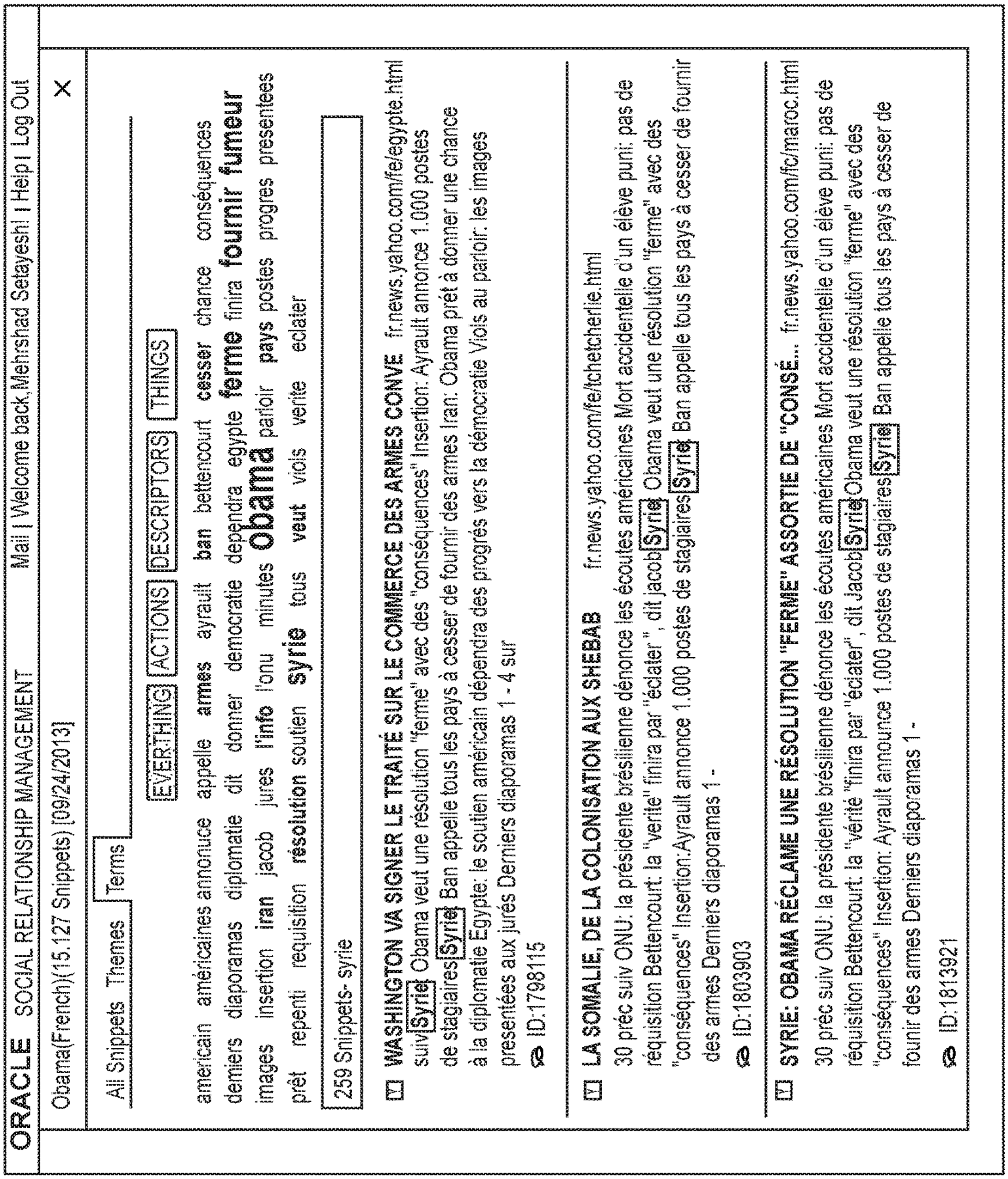

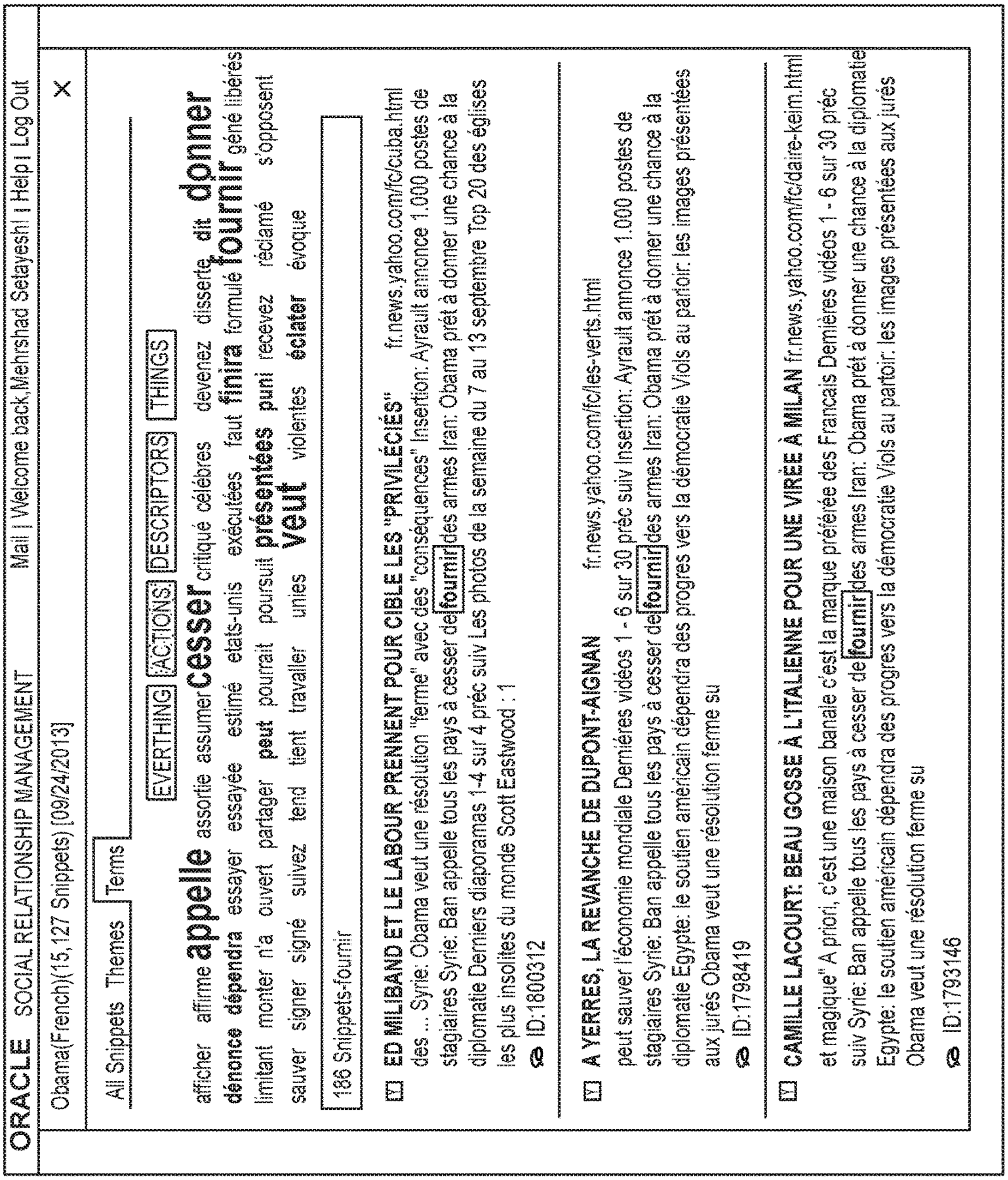

ORACLE SOCIAL RELATIONSHIP MANAGEMENT    Mail | Welcome back,Mehrshad Setayeshi | Help | Log Out Obama(French)(15,127 Snippets) [09/24/2013]    ✕

All Snippets  Themes  Terms

[EVERTHING] [ACTIONS] [DESCRIPTORS] [THINGS]

afficher  affirme appelle  assortie  assumer cesser critique célèbres  devenez  disserta  dit donner
dénonce  dépendra  essayer  essayée  estimé  etats-unis  exécutées  faut finira formulé fournir géné libérés
limitant  monter n'a  ouvert  partager peut  pourrait  poursuit présentées  puni  reclamé  s'opposent
sauver  signer  signé  suivez  tend  tient  travailler  unies veut  violentes éclater  évoque 186 Snippets-fournir ☐ ED MILIBAND ET LE LABOUR PRENNENT POUR CIBLE LES "PRIVILÉCIÉS"    fr.news.yahoo.com/fc/cuba.html
des ... Syrie. Obama veut une résolution "ferme" avec des "conséquences" Insertion: Ayrault annonce 1.000 postes de
stagiaires Syrie. Ban appelle tous les pays à cesser de fournir des armes Iran: Obama prêt à donner une chance à la
diplomatie Dernières diaporamas 1-4 sur 4 préc suiv Les photos de la semaine du 7 au 13 septembre Top 20 des églises
les plus insolites du monde Scott Eastwood : 1
🔗 ID:1800312

☐ A YERRES, LA REVANCHE DE DUPONT-AIGNAN    fr.news.yahoo.com/fc/les-verts.html
peut sauver l'économie mondiale Dernières vidéos 1 - 6 sur 30 préc suiv Insertion: Ayrault annonce 1.000 postes de
stagiaires Syrie. Ban appelle tous les pays à cesser de fournir des armes Iran: Obama prêt à donner une chance à la
diplomatie Egypte: le soutien américain dépendra des progrès vers la démocratie Viols au parloir: les images présentées
aux jurés Obama veut une résolution ferme su
🔗 ID:1798419

☐ CAMILLE LACOURT: BEAU GOSSE À L'ITALIENNE POUR UNE VIRÉE À MILAN fr.news.yahoo.com/fc/claire-keim.html
et magique" A priori, c'est une maison banale c'est la marque préférée des Francais Dernières vidéos 1 - 6 sur 30 préc
suiv Syrie. Ban appelle tous les pays à cesser de fournir des armes Iran: Obama prêt à donner une chance à la diplomatie
Egypte: le soutien américain dépendra des progrès vers la démocratie Viols au parloir: les images présentées aux jurés
Obama veut une résolution ferme su
🔗 ID:1793146

1405

ORACLE SOCIAL RELATIONSHIP MANAGEMENT    Mail | Welcome back,Mehrshad Setayesh! | Help | Log Out Obama(French)(15,127 Snippets) [09/24/2013]

All Snippets  Themes  | Terms |

| EVERTHING | ACTIONS | DESCRIPTORS | THINGS | afp  américain  américaines  annonce  armes  ayrault  ban  bettencourt  chance  conséquences  d'un demiéres
demieres  diaporamas  diplomatie  démocratie  egypte  ferme  fumeur  images  insertion  iran  jacob  jurés
l'info  l'iran  l'onu  minutes  monde  mort  obama  onu  parloir  pays  photos  postes  progrès  prêt
repenti  réquisition  résolution  septembre  soutien  stagiaires  syrie  vers  vidéos  viols  verite  élève 184 Snippets-fumeur ☐ MILEY CYRUS, TORRIDE DANS LE CLIP 23, ET TOUTE LANGUE DEHORS P...  fr.news.yahoo.com/fc/sean-penn.html
   L'info pour vous Obama,[fumeur]repenti...
   ID:1783834

☐ NICOLE KIDMAN: LE BIOPIC SUR LA PRINCESSE EXCLU DE LA COMPÉTI... fr.news.yahoo.com/fc/russell-crowe.html
   L'info pour vous Obama[fumeur]repenti...
   ID:178887

☐ UN ÉLÈVE MODÈLE DE 15 ANS BRAQUE UNE BANQUE                    fr.news.yahoo.com/fc/espagne.html
   L'info pour vous Obama[fumeur]repenti...
   ID:1807526

☐ UN ÉLÈVE MODÈLE DE 15 ANS BRAQUE UNE BANQUE                    fr.news.yahoo.com/fc/espagne.html
   L'info pour vous Obama[fumeur]repenti...
   ID:1813238

1407

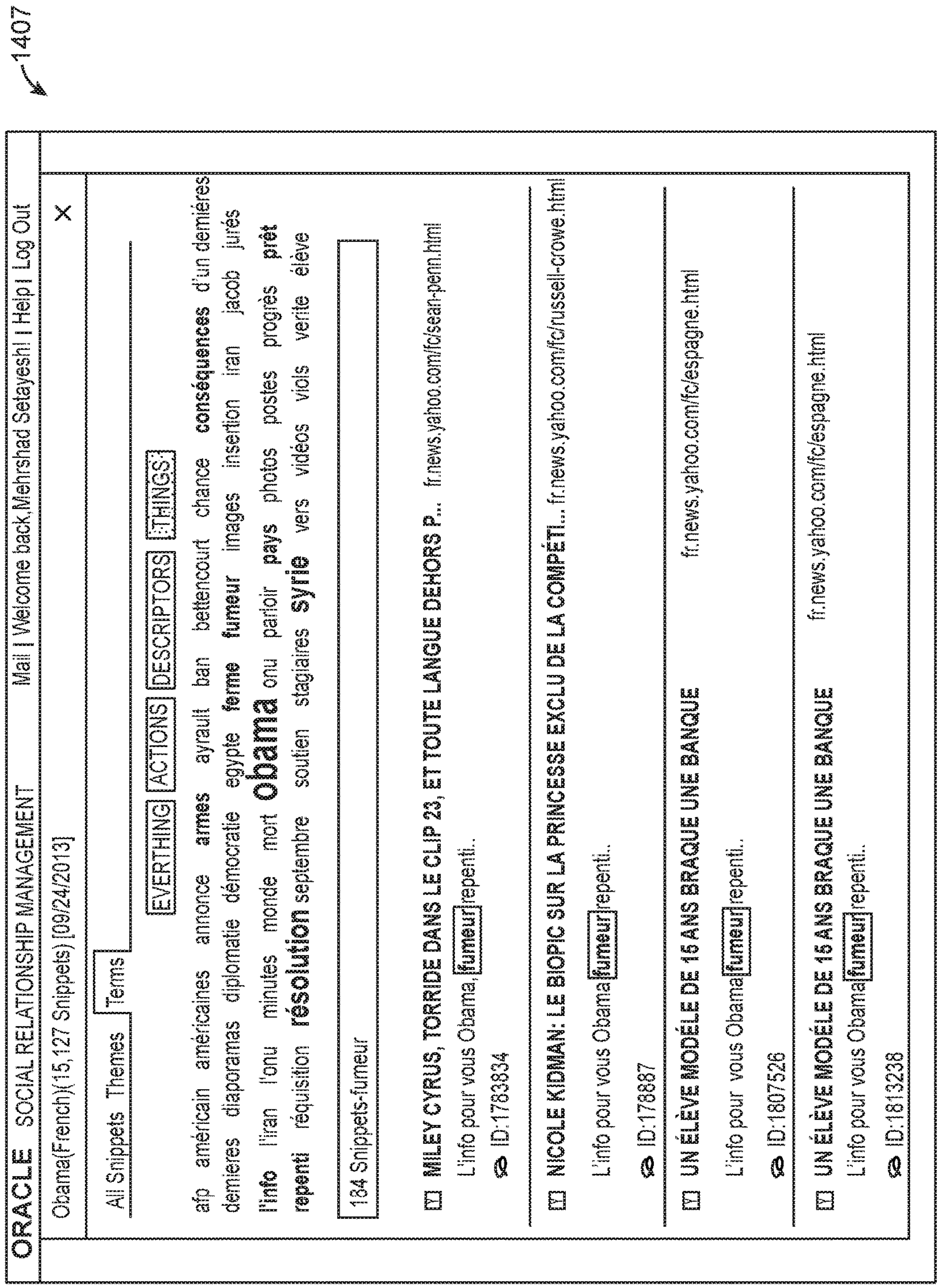

FIG. 14d

METHOD AND SYSTEM FOR PERFORMING TERM ANALYSIS IN SOCIAL DATA

CROSS-REFERENCE TO RELATED APPLICATIONS

The present application claims the benefit of priority to U.S. Provisional Application Ser. No. 61/897,089, filed on Oct. 29, 2013, entitled, "METHOD AND SYSTEM FOR PERFORMING TERM ANALYSIS IN SOCIAL DATA", which is hereby incorporated by reference in its entirety.

BACKGROUND

Given the widespread availability and usage of the internet by consumers, many businesses have become interested in being able to effectively monitor the content and commentary provided by such consumers. Interactive websites such as social networks and blogs provide a wealth of useful information that can be advantageously used by a business.

It is possible to monitor the content of social media sites to identify the ranges of topics that are being commented about by users on the sites. By knowing about and understanding these topics, many businesses can then act upon that information to increase sales and revenue. It would be very desirable to allow the businesses to stay informed of actionable social networking content, for example, to identify potential customers and possible sales leads or to identify problematic situations that may require immediate involvement of customer service personnel.

For example, consider a CRM (Customer Relationship Management) application, which is designed to facilitate the ability of a business to create, develop, and build relationships with its customers or potential customers. It would be very desirable to allow the business CRM application to stay informed of actionable social networking content, for example, to identify potential customers and possible sales leads.

As another example, brand managers are often interested in monitoring commentary on the internet regarding their brands or competitors' brands. Brand managers may read the commentary to gauge interest in their marketing materials, receive feedback regarding their products, or take further action regarding any postings that warrant some type of follow-up response.

Embodiments of the present invention provide a system, method, and computer program product for allowing an entity to access social media data, and to perform term analysis upon that data. The invention is capable of accessing data across multiple types of internet-based sources of social data and commentary. A user interface is provided that allows the user to view and interact with the results of performing term analysis.

Other additional objects, features, and advantages of the invention are described in the detailed description, figures, and claims.

BRIEF DESCRIPTION OF THE FIGURES

FIGS. 7-11 are examples of user interfaces that can be used to display and control the term analysis to the user.

FIG. 14*a-d* show example interfaces for displaying term analysis results based on the selected language.

DETAILED DESCRIPTION

The present disclosure is directed to an approach for performing term analysis of data. The invention performs analysis upon a set of data to identify the type, frequency, and context for terms that are used within the data. This type of analysis can be used to more accurately and comprehensively understand the significance of data retrieved and reviewed from various sources.

Consider if it is desired to perform analysis upon data from one or more social media sites. The analysis may be performed for any suitable purpose. For example, consider the situation where a marketer wishes to perform sentiment analysis for a given topic. The sentiment analysis will analyze a set of data from the social media sites, and will attempt to identify which of the content (e.g., posting, messages, blogs, etc.) provides either a positive or negative sentiment for the topic of interest.

Figure 7:
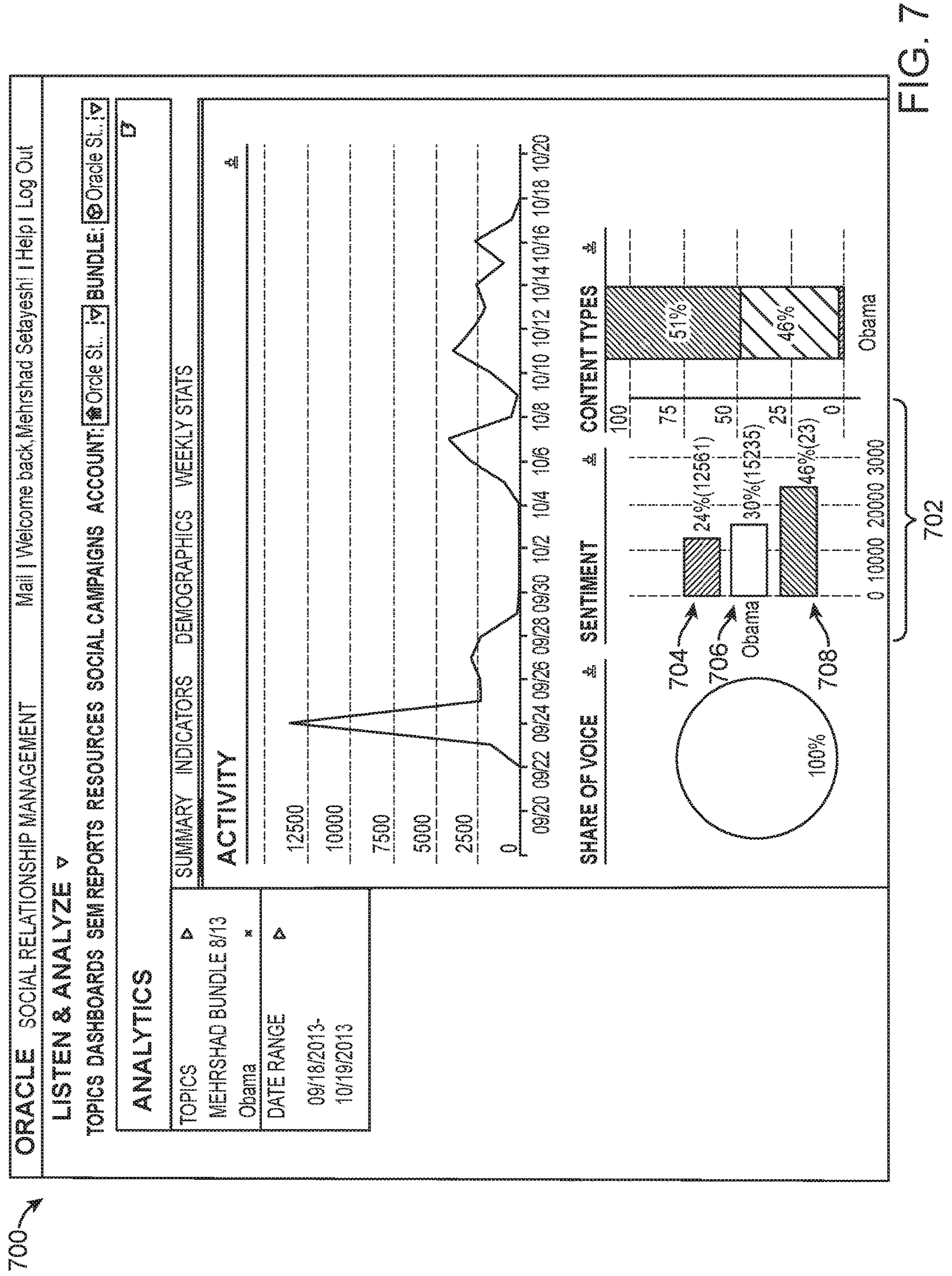

FIG. 7 illustrates an example interface for viewing the results of performing analysis upon data from social media sites for a given topic (e.g., using a social relationship management tool such as the SRM product available from Oracle Corporation of Redwood Shores, Calif.). This example interface shows a dashboard 700 containing an interface portion 702 for visually displaying the sentiment analysis results for a topic of interest (e.g., the "Obama" topic). Within the interface portion 702, results are displayed that indicate the percentage/number of the analyzed content that expresses a positive sentiment (704), neutral sentiment (706), or negative sentiment (708).

In conjunction with this sentiment analysis, the present invention provides a mechanism for allowing the user to better understand the context of the content that provides the underpinnings for the sentiment analysis. The way this is accomplished is by identifying the terms that most frequently appear within the content that correlate to the identified sentiment(s).

Figure 8:
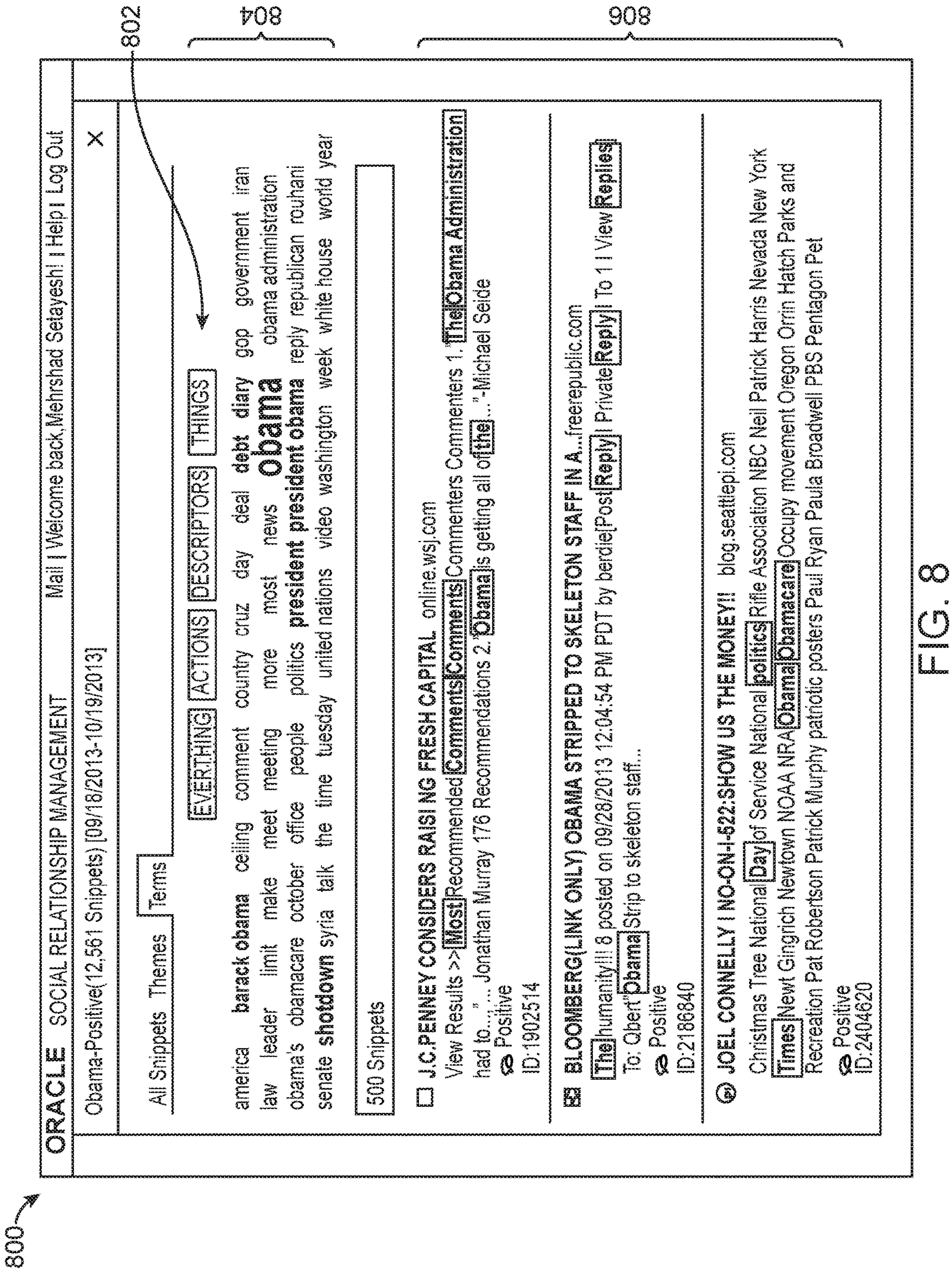

To explain, assume that the user is interested in drilling down further into the set of content that underlies the "positive" sentiment for the topic of interest. FIG. 8 illustrates an example interface 800 that can be used to display the results of performing this term analysis. Interface 800 can be configured to include several distinct interface portions.

Interface portion 804 contains a listing of the top n (e.g., top 50) terms that appear within the set of content that tracks to the "positive" sentiment. Each of the terms may be visualized or highlighted in a way to provide further information about that term. For example, the size of the font for the displayed term can be selected to indicate the relative frequency of that term within the content (e.g., where a larger font size indicates greater frequency for the term). In addition, having the mouse hover over a given term can be used to control a further display of information for the term (e.g., by having a ghosted window display the exact number of times that the term appears within the content).

Interface portion 806 displays some or all of the underlying content that corresponds to one of the terms displayed in portion 804. When one of the terms is selected, portion 806 displays the underlying content, which the user can scroll through to review the exact wording that gives rise to the sentiment analysis. In some embodiments, the displayed content comprises a "snippet", which may not be the entirety of the content. Instead, the snippet may only contain a given number of words on either side of the occurrence of the word/topic of interest within the content. For example, if the topic of interest is "Obama", then snippets can be created that extend 200 words in either direction from any suitable occurrence of the word "Obama" within the underlying content. The snippets in interface portion 806 may be displayed in any desired order, e.g., ordered by time, date, size, content significance, etc.

Figure 9:
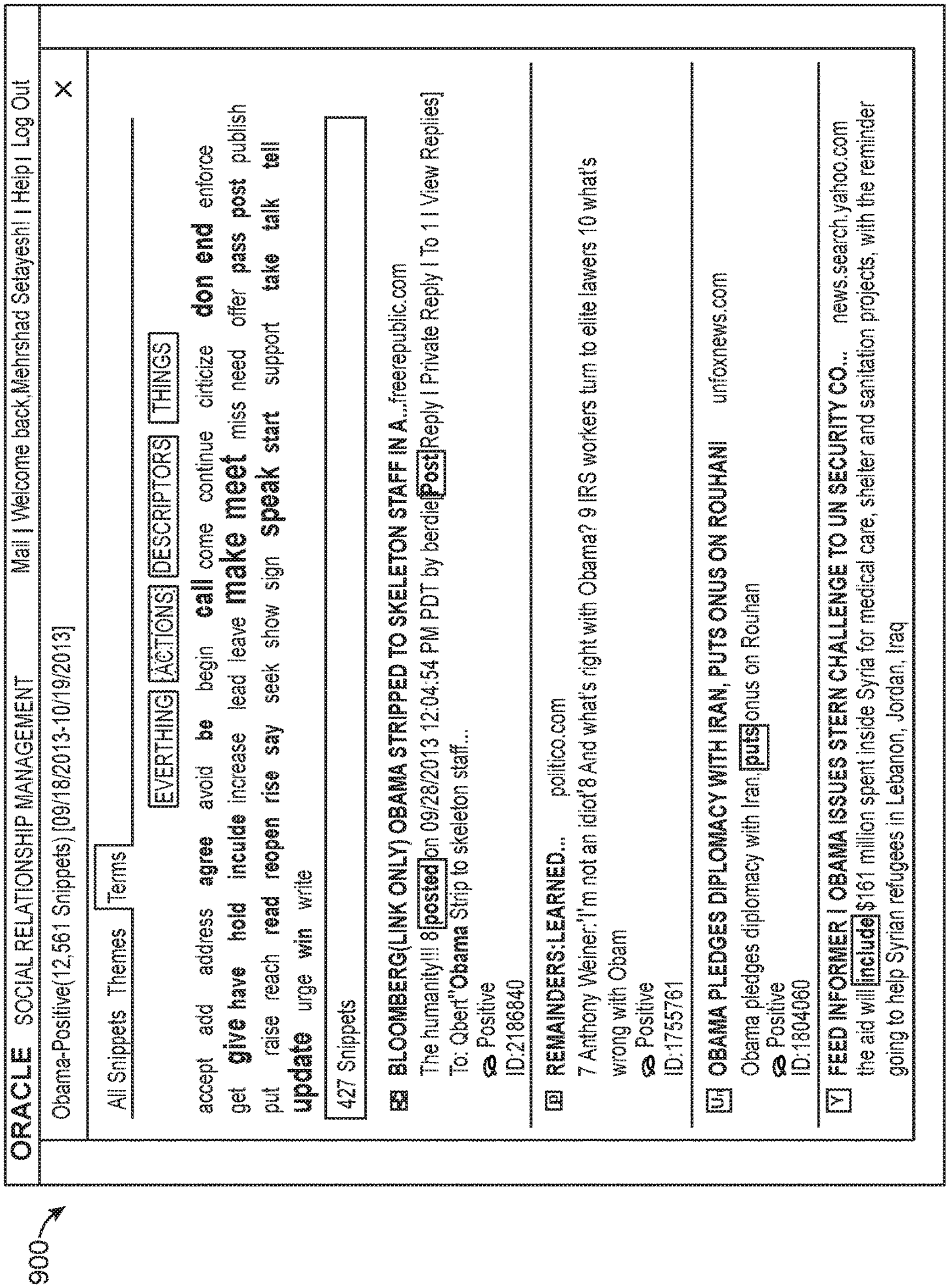

Interface portion 802 identifies and controls the "type" of the terms that are identified within the content. In the present embodiment, one selectable option is to display all of the terms that are identified for the term analysis (e.g., "everything" option). Another possible option is to only display action-related terms (e.g., by selecting the "actions" option in interface portion 802, as shown in FIG. 9). Yet another option is to only display description-related terms (e.g., by selecting the "descriptions" option in interface portion 802, as shown in FIG. 10). Another option is to only display things-related terms (e.g., by selecting the "things" option in interface portion 802, as shown in FIG. 11).

Figure 1:
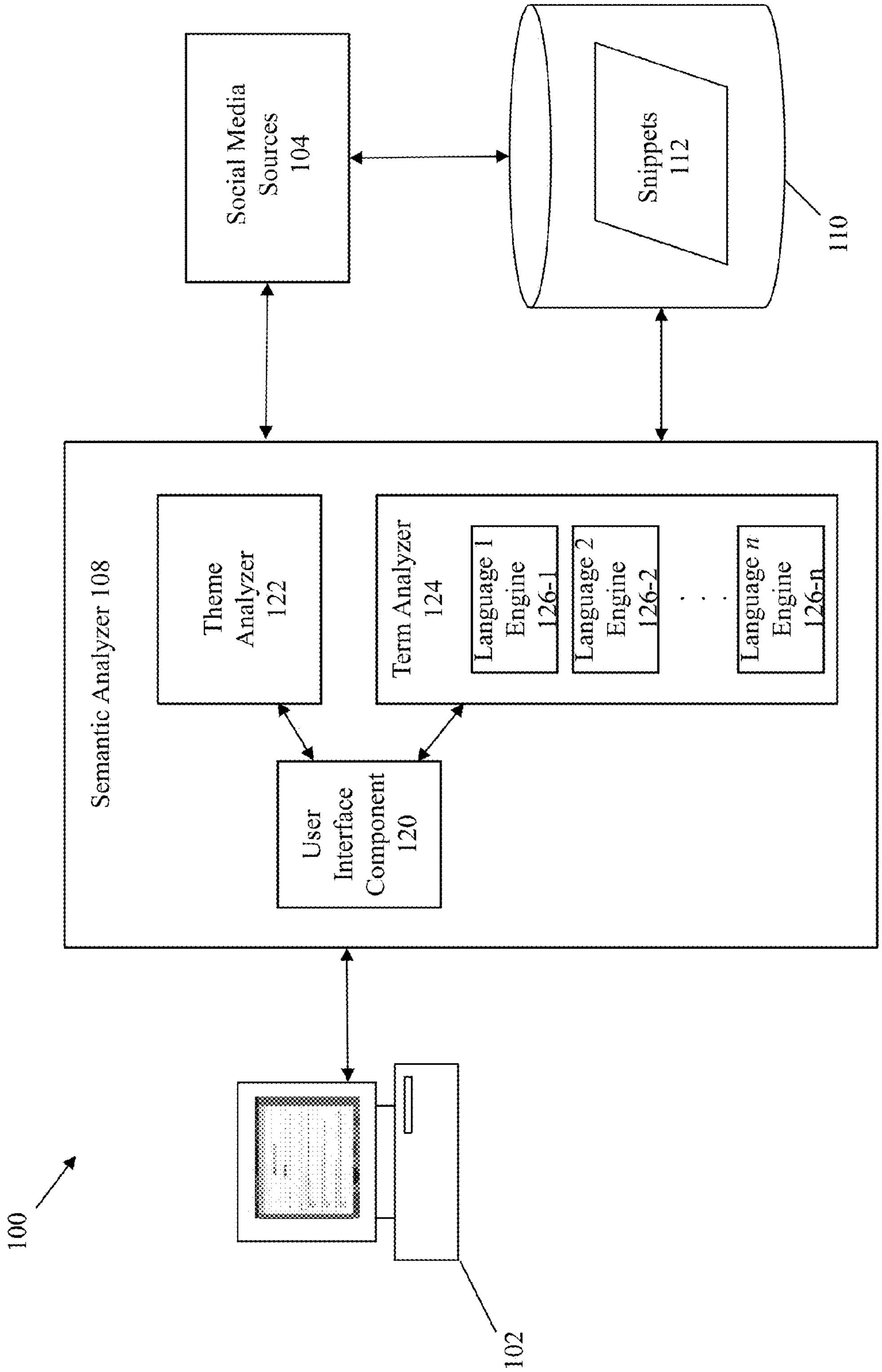
FIG. 1 illustrates a system to implement trend analysis over social media data according to embodiments of the invention.

FIG. 1 illustrates an example system 100 which may be employed in some embodiments of the invention to implement term analysis. The system includes one or more users at one or more user stations 102 that operate the system. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs to the enterprise application 104 and/or trend analysis tool 106.

A semantic analyzer 108 receives data from one or more online social data sources 104. Such social data sources 104 include, for example, websites such as a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Semantic analysis is performed upon the social media data by the semantic analyzer 108. The semantic analyzer 108 may be implemented as a standalone tool, or can be included as a component within another tool, e.g., a social relationship management tool.

In some embodiments, the semantic analyzer 108 comprises a theme analyzer 122 to identify themes within the social media data. Themes can be identified, for example, by performing semantic analysis and identifying semantic clusters within the analyzed data. The semantic clusters correspond to themes within the social media data.

For example, latent semantic analysis (LSA), an advanced form of statistical language modeling, can be used to perform semantic analysis upon the content. This permits the system to understand the contextual and semantic significance of terms that appear within the social data. For example semantic analysis can be used to understand the difference between the term "Galaxy" used in the author writing for astronomy content, and "Galaxy" in the author writing to refer to the name of a professional soccer team.

Classification of the results is then performed on the analyzed data. Performing semantic analysis along with classification of the social media data permits the system to create and identify themes, and to cluster together like-minded messages, topics, conversations, and content from the authors. This action is performed by categorizing the subjects of the analyzed content.

In some embodiments, the social data content is subject to semantic filtering to reduce the excess "noise" of irrelevant data. Semantic filtering is a mechanism that is provided to minimize miss-categorizations of the social data. Much of the social data is likely to contain content which is of very little interest. Semantic filtering is used to remove the irrelevant material from the social data to reduce the occurrence of false positives, false negatives, and inappropriate responses/rejections within the actionable data. This permits the resulting data to be more relevant and accurate.

An example approach that can be taken to implement theme analysis is described in U.S. Provisional Application 61/909,076, filed on Nov. 26, 2013, which is hereby incorporated by reference in its entirety.

A term analyzer 124 is the component that is employed to perform term analysis. The term analyzer 124 comprises one or more language engines (126-1 to **126-*n*), each of which provides the services to perform term analysis for a respective language. The operations of the term analyzer 124** are described in more detail below.

A user interface component 120 generates the content that is visually displayed to a user at user station 102. This content includes, for example, the interface elements shown in FIGS. 7-11. The user interface component 120 may also be used to retrieve user inputs through the user interface to control the operations of the term analyzer 124.

The term analysis results, data from the social media sources 104, and/or snippets 112 can be stored into a database in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Figure 2:
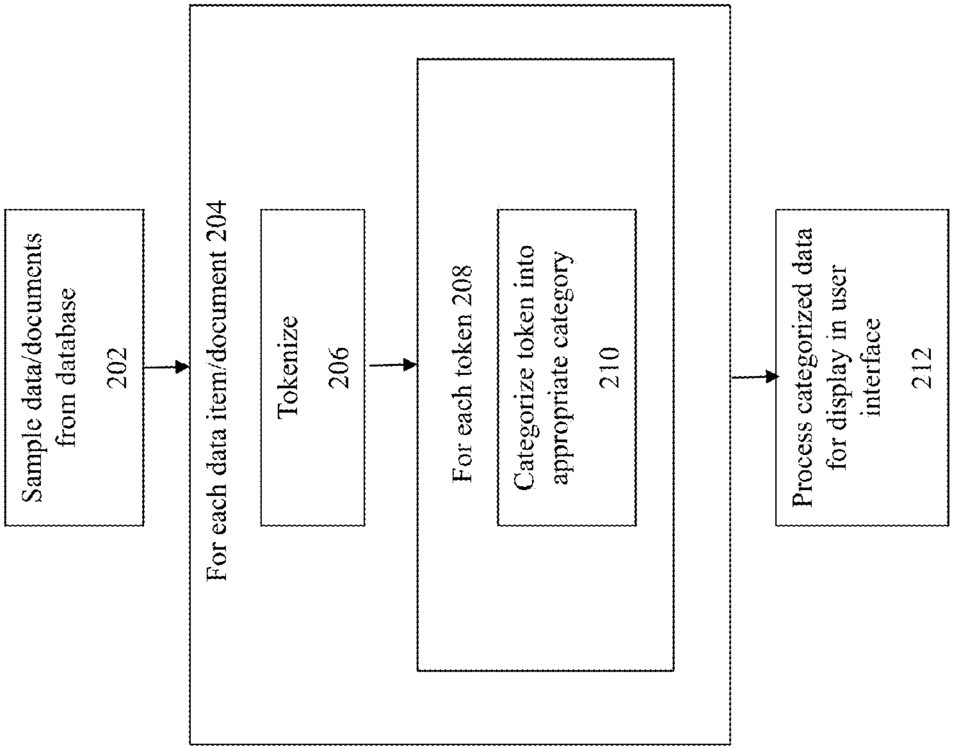
FIG. 2 shows a flowchart of an approach to perform term analysis according to some embodiments of the invention.

FIG. 2 shows a flowchart of an approach to perform term analysis according to some embodiments of the invention. At 202, sampling is performed to obtain data to analyze for term analysis. The general idea is that, instead of performing term analysis upon the entirety of the data, the analysis can be performed for a selected sampling of the data. Assuming that the samples are properly extracted from the underlying content, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

For each data item/document that is sampled at 202, the actions 204 are performed. These actions include tokenizing for each of the data items/documents at 206. For each of the tokens identified at 206, the actions of 208 are performed. This includes categorizing of the token and/or its related content into the appropriate category, e.g., into the “actions”, “descriptions”, or “things” category.

Thereafter, at 212, the categorized data is processed for display to the user in the user interface. FIGS. 8-11 illustrate example interfaces that can be used to display the results of performing term analysis to a user.

As noted above, sampling can be performed to obtain data to analyze for term analysis (step 202). In some embodiments, the sampling is performed in response to user controls to begin the analysis. For example, from the dashboard 700 of FIG. 7, the user may be desirous of performing the analysis for a given location within the “Activity” chart (e.g., at one of the peak locations). The interface 700 can therefore be configured to begin the analysis upon user selection of a given position within the activity chart portion of the interface 700. This creates a “request” for term analysis that corresponds to a “session” having a corresponding “session ID”. The analysis can also be initiated from other portions of the interface 700 as well, e.g., from the portion 702 that pertains to sentiment.

Figure 3:
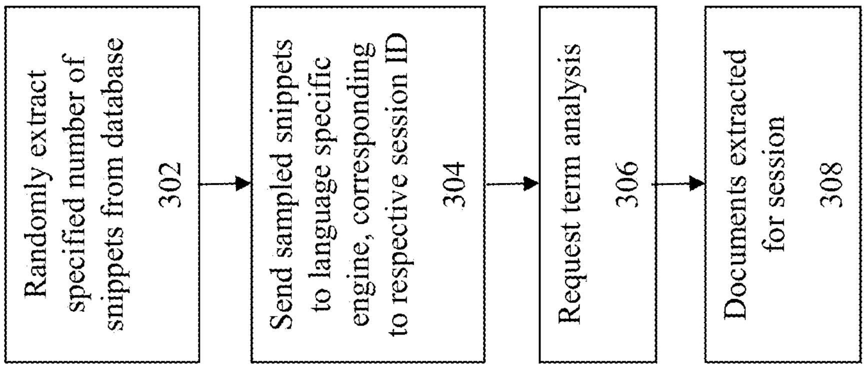
FIG. 3 shows a flowchart of an example approach to implement sampling.

FIG. 3 shows a flowchart of an example approach to implement sampling. At 302, the approach extracts a number of data items/documents from the database. In some embodiments, snippets are extracted from the database, where each snippet comprises a certain number of content (e.g., 400 words) that are centered around a word of interest.

The snippets are randomly extracted from the database, to facilitate statistical correctness for the content that is selected for sampling. The number of samples is selected to balance the need for enough samples to allow correlation of analysis results to the entire data population, while limiting the numbers needed for analysis to optimize performance. In some embodiments, 500-1000 snippets are randomly sampled.

At 304, the sampled documents are sent to a language-specific term-processing service. In some embodiments, the sampled documents are held by the system in a way that correspond the documents to a given session ID—the session ID for the request that causes the documents to be sampled. Therefore, the documents are stored in a manner that correspond to the session, and for which a session ID may be returned.

At 306, the request is made for term analysis on the documents corresponding to the session, e.g., where the request includes the respective session ID associated with the documents. One reason to take this approach is for embodiments that may perform both theme analysis and term analysis, where the underlying documents may be held and possibly analyzed for either analysis. In this situation, the additional request is made to perform term analysis on the documents. Thereafter, at 308, the documents are extracted from the session.

Figure 4:
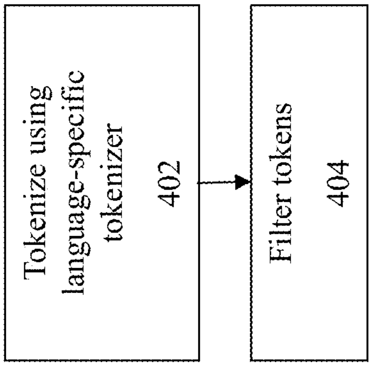
FIG. 4 shows a flowchart of an approach to perform tokenizing according to some embodiments of the invention.

As noted above, for each of the documents, tokenizing is performed (at step 206). FIG. 4 shows a flowchart of an approach to perform tokenizing according to some embodiments of the invention. At 402, the document is tokenized using a language-specific tokenizer. Lexical analysis is performed to convert the sequence of individual characters from the document into tokens. Since each different language has its own unique set of lexical structure and content, a language-specific tokenizer is employed to perform the tokenizing process for documents in the respective languages.

At 404, filtering is performed on the identified tokens. The filtering is used to remove stop words from the list of tokens. Such stop words may include, for example, “and”, “or”, “the”, “to”, “be”, “is”, “at”.

Figure 5:
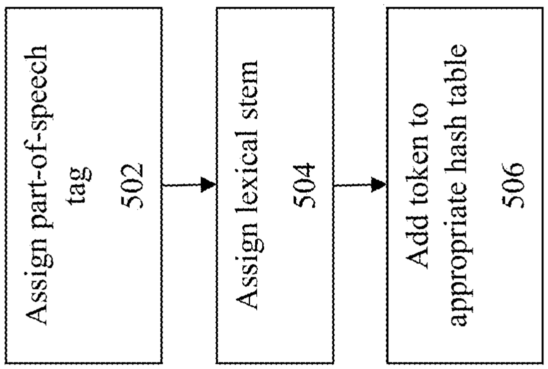
FIG. 5 shows a flowchart of an approach to implement categorization according to some embodiments of the invention.

Categorization can then be performed on each of the identified and filtered tokens (step 210). FIG. 5 shows a flowchart of an approach to implement categorization according to some embodiments of the invention. At 502, the token is analyzed based on its part of speech, where a determination is made whether the token is a noun, verb, or adjective/adverb. As noted above, some embodiments of the invention permit the user to use the interface to selectively review snippets that pertain to “actions”, “descriptions” or “things”. In the current embodiment, a token that is a verb is identified to be in the “action” category, a token that is a noun is identified to be in the “things” category, and a token that is an adjective/adverb is identified to be in the “descriptions” category. A part-of-speech tag is assigned to the token based upon this part-of-speech determination.

At 504, lexical stems are assigned to the appropriate part-of-speech tag, where morphological root forms are properly identified and used to assign the lexical stems. For example, the terms “run”, “ran”, and “running” can all be collected together to a common lexical stem.

At 506, the token is added to the appropriate categorization “bucket”. In some embodiments, three hash tables are maintained that correspond to the (a) noun, (b) verb; and (c) adjective/adverb categorizes. The token is added to the appropriate hash table based on the part-of-speech tag assigned to the token, where the lexical stem is used as the key.

Figure 6:
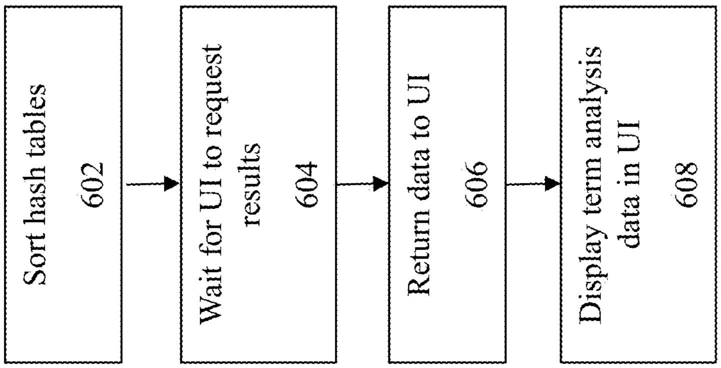
FIG. 6 shows a flowchart of an approach to process the data for display.

Once the tokens have been properly categorized, the data is processed for display to the user (step 212). FIG. 6 shows a flowchart of an approach to process the data for display. At 602, the hash tables are sorted. Any suitable sorting methodology can be employed as desired to implement display preferences. For example, the hash tables can be sorted by frequency of occurrence (e.g., descending) of each stem variant.

At 604, the UI (user interface) waits for the user to provide input regarding data to be displayed. For example, the user may select any of the “everything”, “actions”, “descriptions”, or “things” buttons on the user interface. The request from the UI may be implemented as a request for results for a term session, where the request is made using the session ID.

At 606, the analysis data for the selected results are returned to the user interface. In some embodiments, a JSON (javascript object notation) structure is returned that contains the information from any or all of the three hash tables. Thereafter, at 608, the data is displayed to the user in the user interface.

As noted above, the way that the terms are displayed in the user interface correlates to a relative ordering of the terms. For example, the terms corresponding to a relatively higher frequency number will have a relatively higher font size and/or darker display color/shading, whereas the terms corresponding to a relatively lower frequency number will have a relatively smaller font size and/or lighter display color/shading. The font sizes/coloring can be configured to have set ranges for display in a particular font/coloring. Alternatively, the font size can be in a range that is calculated using the relative positioning of the term's frequency within the overall range of the frequencies. For example, the term larger having the highest frequency can be displayed with the largest font and darkest shade/color, while the term having the smallest frequency is displayed with the smallest font and lightest shade/color. For terms having frequency numbers that are in the range between the max/min frequencies, the font size and shade are proportionally set to their relative positioning in that range.

As described above, the term analyzer can comprise one or more language engines which provide the services to perform term analysis for a respective language. For each of the different languages, the operations of term analyzer described above can be performed that is specific to the language of interest. For example, the language-specific tokenizers are configured to include a database of information/terms that is specific to the particular language of the language engine. The mechanisms to assign part-of-speech tags and lexical stems operate according to the rules, grammar, constructs, and words of the specific language to which a language engine is directed.

FIGS. 7-11 are examples of user interfaces that can be used to display and control the term analysis to the user. FIG. 7 illustrates an example interface for viewing the results of performing analysis upon data from social media sites for a given topic. Semantic analysis is performed that includes theme analysis with respect to the topic of interest, e.g., using latent semantic analysis. The results of the semantic analysis are visually provided in the user interface in FIG. 7, which includes a dashboard 700 containing different interface portions for visually displaying the sentiment analysis results for a topic of interest (e.g., the "Obama" topic). Within the interface portion 702, results are displayed that indicate the percentage/number of the analyzed content that expresses a positive sentiment (704), neutral sentiment (706), or negative sentiment (708). Other interface portions may also be provided, e.g., to provide a chart that tracks activity over time, content types, or a share of voice.

The user can drill down into selected ones of the content in the interface to perform term analysis. For example, FIG. 8 shows an example interface for when the user drills down further into the set of content, such as the content that underlies the "positive" sentiment for the topic of interest or at a specific location on the activity chart. Here, the figure shows an interface 800 that displays the results of performing this term analysis. Interface 800 can be configured to include several distinct interface portions. Interface portion 804 contains a listing of the top n terms that appear within the set of content that tracks to the "positive" sentiment. Each of the terms may be visualized or highlighted in a way to provide further information about that term. For example, the size of the font for the displayed term can be selected to indicate the relative frequency of that term within the content (e.g., where a larger font size indicates greater frequency for the term). In addition, having the mouse hover over a given term can be used to control a further display of information for the term (e.g., by having a ghosted window display the exact number of times that the term appears within the content).

Interface portion 806 displays some or all of the underlying content that corresponds to one of the terms displayed in portion 804. When one of the terms is selected, portion 806 displays the underlying content, which the user can scroll through to review the exact wording that gives rise to the sentiment analysis. In some embodiments, the displayed content comprises a "snippet", which may not be the entirety of the content. Instead, the snippet may only contain a given number of words on either side of the occurrence of the word/topic of interest within the content. For example, if the topic of interest is "Obama", then snippets can be created that extend 200 words in either direction from any suitable occurrence of the word "Obama" within the underlying content. The snippets in interface portion 806 may be displayed in any desired order, e.g., ordered by time, date, size, content significance, etc.

Interface portion 802 identifies and controls the "type" of the terms that are identified within the content, e.g., action-type terms, description-type terms, or things-related terms. In the present embodiment, one selectable option is to display all of the terms that are identified for the term analysis (e.g., "everything" option). Another option is to only select one of these types for display.

FIG. 9 illustrates an interface 900 that only displays action-related terms. Each of the terms may be visualized or highlighted in a way to provide further information about that term. For example, the size of the font for the displayed terms (e.g., "make" and "meet") can be emphasized to indicate the higher relative frequency of that term within the content (e.g., where a larger font size indicates greater frequency for the term). Moreover, a given term can be selected to control a further display of information for the term (e.g., by having a ghosted window display the exact number of times that the term appears within the content).

FIG. 10 illustrates an interface 1000 that only displays description-related terms. FIG. 11 illustrates an interface 1100 that only displays things-related terms. As described above, each of the terms may be visualized or highlighted in a way to provide further information about that term. For example, the size of the font for the displayed terms (e.g., "more" and "most" in FIG. 10 and "Obama" in FIG. 11) can be emphasized to indicate the higher relative frequency of that term within the content, where a larger font size indicates greater frequency for the term. Terms can also be selected to control a further display of information for the term.

Figure 12:
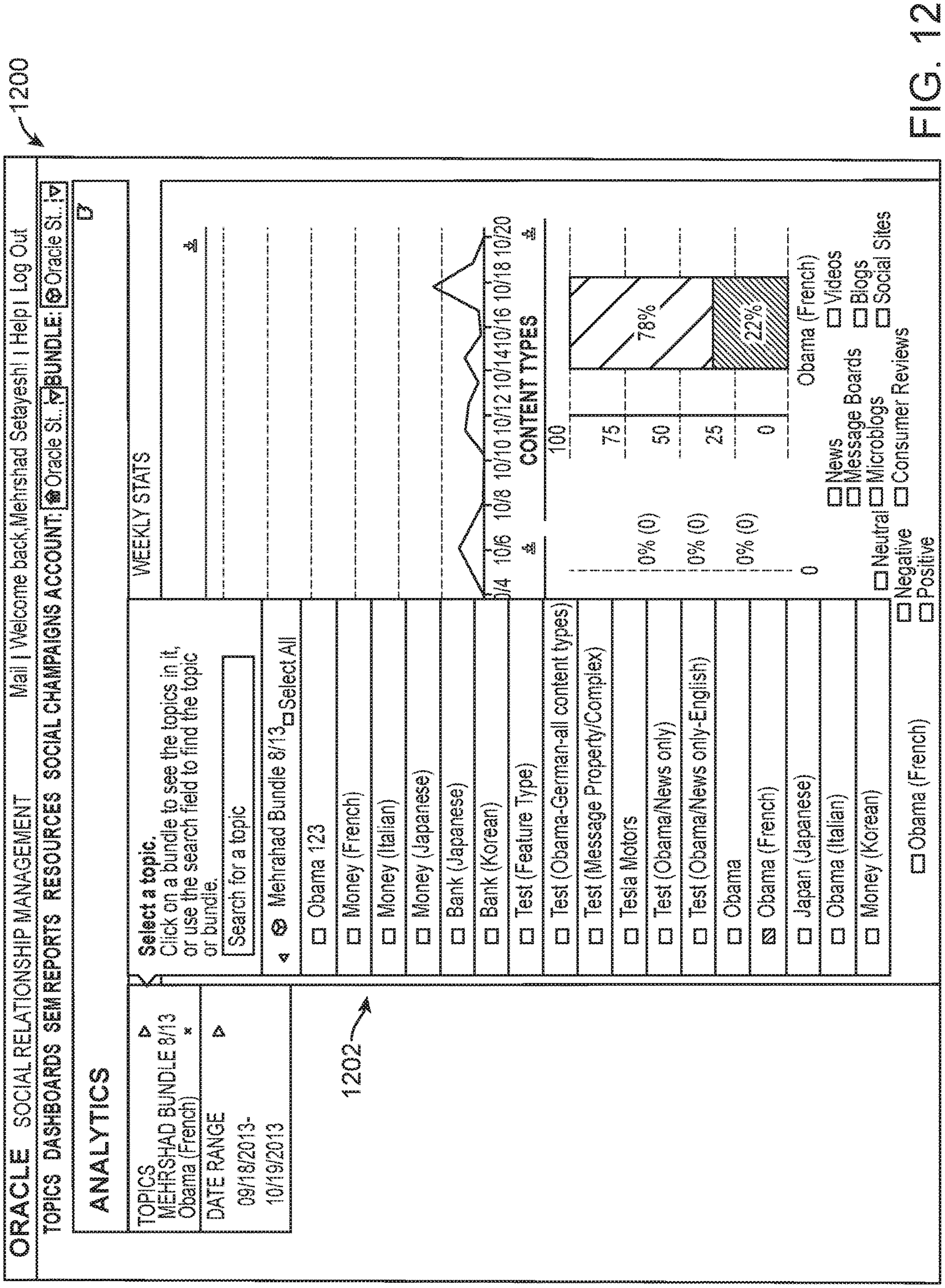
FIG. 12 shows an example interface for selecting a specific language for analysis for a given topic.

As previously noted, the term analysis can be performed in multiple languages. FIG. 12 shows an example interface 1200 for selecting a specific language for analysis for a given topic. A menu 1202 is provided to select a topic in one or more languages. This is implemented, for example, by using a term analyzer that comprises one or more language engines, each of which provides the services to perform term analysis for a respective language.

Figure 13:
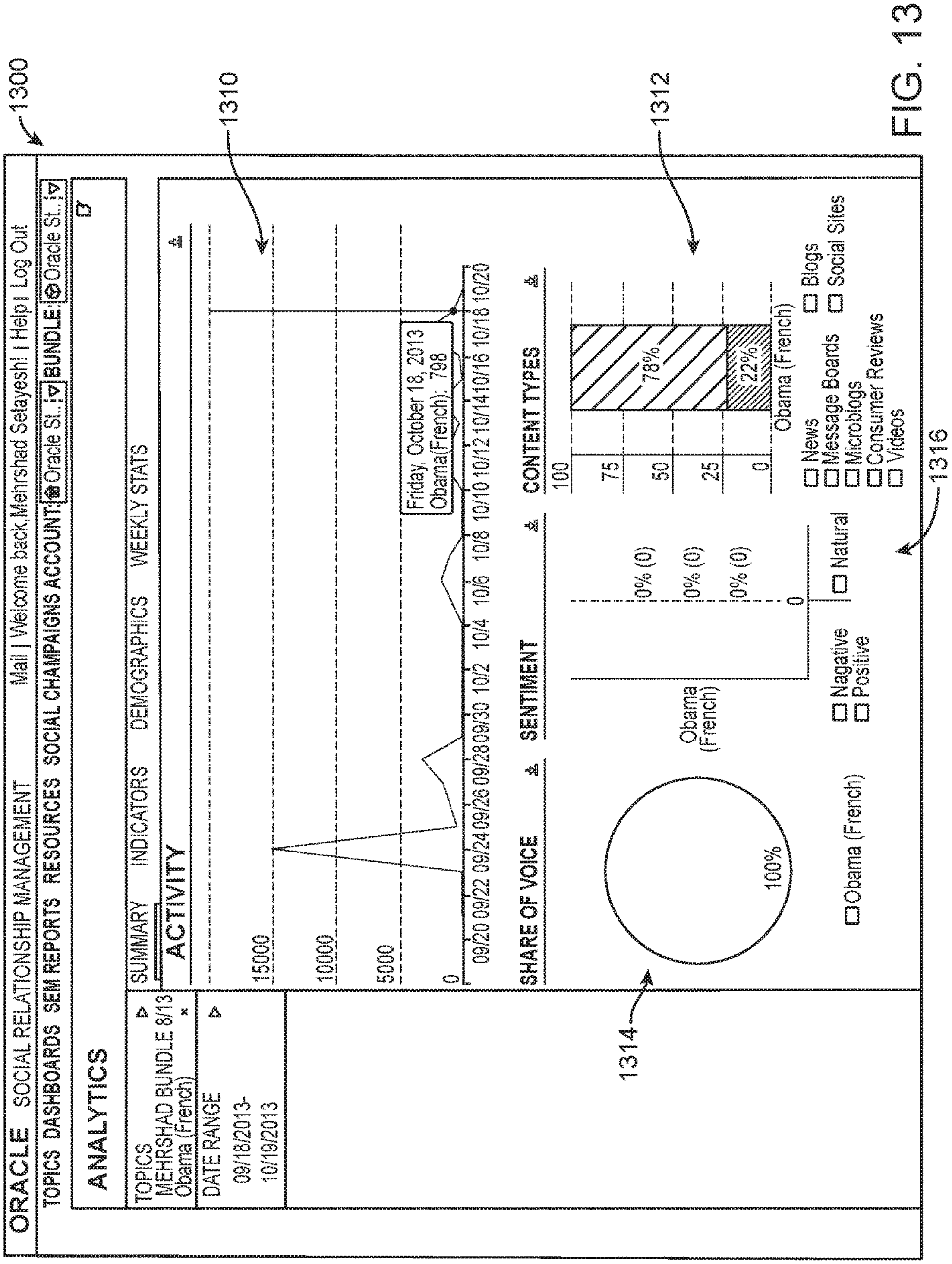
FIG. 13 shows an example dashboard for the analysis in the selected language.

FIG. 13 shows an example dashboard 1300 for the analysis in the selected language. Portion 1310 provides information about activity levels for the topic in the selected language. Portion 1312 identifies the content types in the analysis, e.g., news, blogs, message boards, microblogs, social sites, consumer reviews, and/or videos. Portion 1314 provides information about the share of voices for the topic of interest. Portion 1316 displays sentiment analysis results for the topic of interest.

Figure 14C:
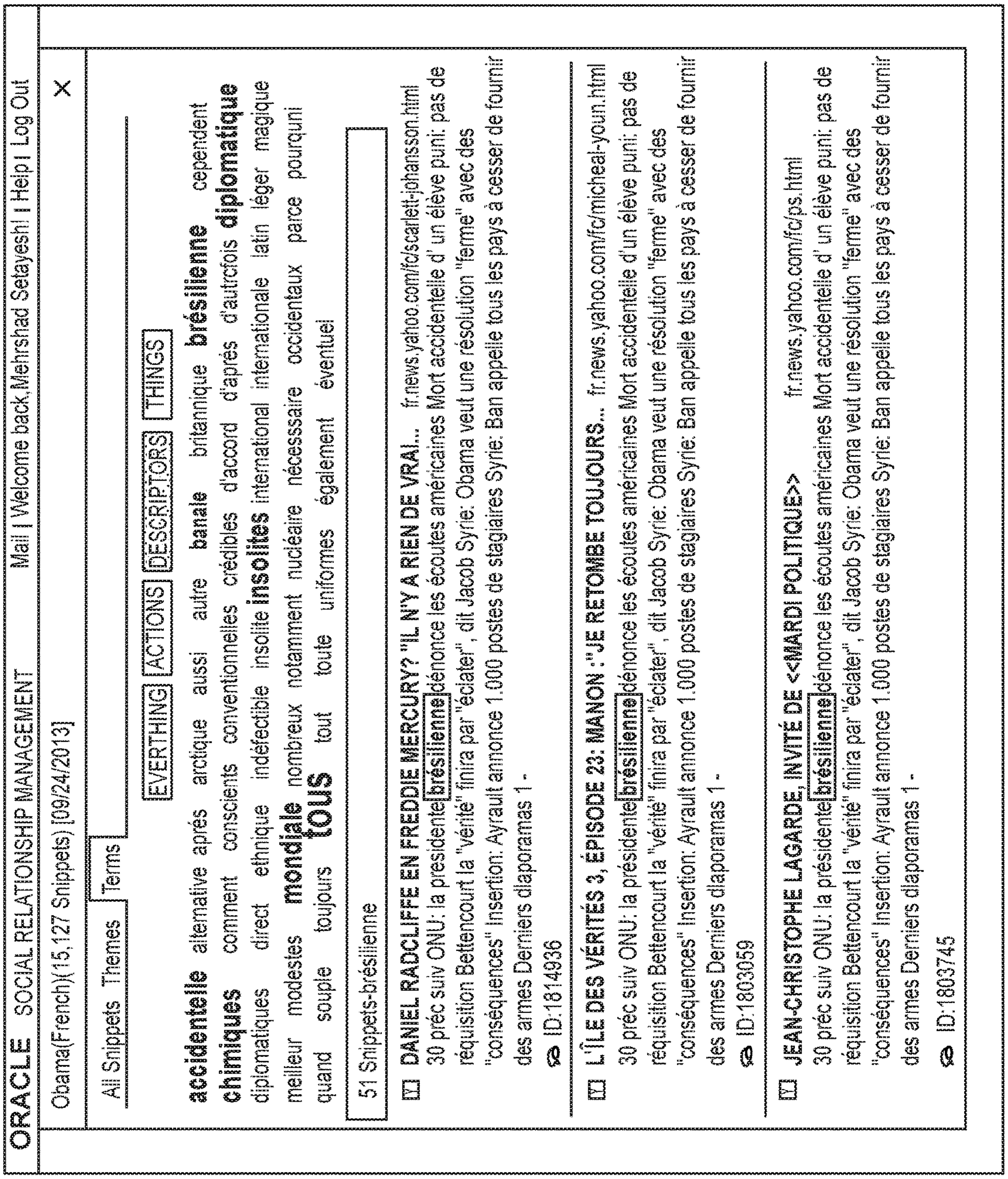

FIG. 14*a-d* show example interfaces for displaying term analysis results based on a selected language. These figures are similar to ones previously described above, with the difference pertaining to the language used for the analysis and the language of the content that is analyzed/displayed in the set of results. These figures provide different views of the interface when analyzing content using a language engine for the French language content, where the different interfaces correspond to the different "type" of the terms that are identified within the content. FIG. 14*a* shows an interface 1401 where a selectable option is provided to display all of the terms that are identified for the term analysis (e.g., "everything" option) for the language option. FIG. 14*b* shows an interface 1403 that only displays action-related terms for the language option. FIG. 14*c* shows an interface 1405 that only displays description-related terms for the language option. FIG. 14*d* shows an interface 1407 that only displays things-related terms for the language option.

Therefore, what has been described is an improved system, method, and computer program product for performing term analysis of data, e.g., content from social media data. Semantic analysis can be performed on content from social media sites, where the results are displayed in a dashboard interface. To provide greater understanding and context for the semantic analysis results, the term analysis allows one to visually see and understand the frequency and distribution of terms that appear in the underlying data. This provides many advantages, e.g., by allowing an enterprise or business to more effectively market to the consumers based upon this knowledge of the consumers' interests, concerns, and thoughts.

System Architecture Overview

Figure 15:
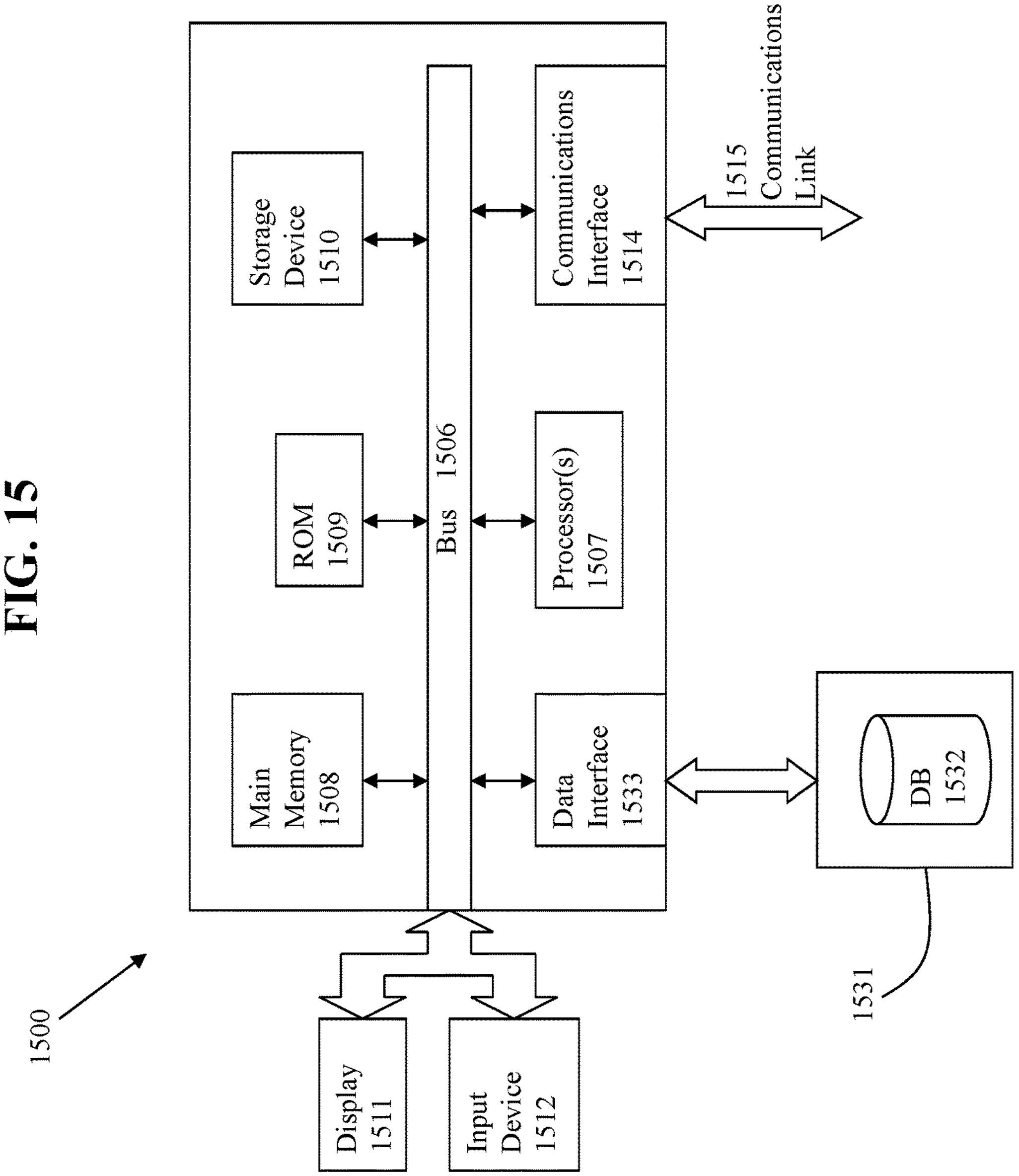
FIG. 15 depicts a computerized system on which an embodiment of the invention can be implemented.

FIG. 15 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to one embodiment of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any tangible medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508. A data interface 1533 may be provided to interface with medium 1531 having a database 1532 stored therein.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1515 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:

receiving content from one or more sources;

performing semantic analysis upon the content from the one or more sources to generate semantic analysis results;

displaying the semantic analysis results for a topic of interest in a first graphical user interface on a display device, the first graphical user interface comprising a selectable user interface component such that different portions from the selectable user interface component corresponds to different subsets of the semantic analysis results;

receiving a user input through the first graphical user interface corresponding to selection of at least one portion of the selectable user interface component to initiate a drill down analysis for a selected subset of the semantic analysis results;

identifying, for the selected subset of semantic analysis results on the first user interface, a frequency of terms identified within the content received from one or more sources to generate the semantic analysis results generating snippets for the selected subset of the semantic analysis results on the first user interface by removing at least one or more portions of the content, the one or more portions removed to establish a specified number of content items centered around an item within the content, and storing the snippets in a database in a tangible computer readable storage device;

displaying the frequency of terms within a first portion of a second graphical user interface on a display device such that displayed items in the first portion of the second graphical user interface have different visual appearances to visually differentiate frequency levels for the displayed items, the different visual appearances proportional to the frequency levels for the displayed items, the different visual appearances comprising at least one of a size, a shade, or a color;

displaying snippets within a second portion of the second graphical user interface on the display device;

receiving a user input through the second graphical user interface corresponding to selection of one item from the displayed items in the first portion of the second graphical user interface; and configuring the second portion to display a subset of the set of snippets, the subset of the snippets corresponding to the one item selected using the user input in the second graphical user interface.

2. The method of claim 1, wherein identifying a frequency of terms comprises:

sampling from the content;

tokenizing the sampled content into tokens;

categorizing the tokens; and processing the categorized tokens to generate the user interface.

3. The method of claim 2, wherein sampling comprises randomly extracting a specified number of data from the content.

4. The method of claim 2, wherein tokenizing is performed by using a language-specific tokenizer.

5. The method of claim 2, wherein tokenizing is performed by filtering stop words from the tokens.

6. The method of claim 2, wherein categorization of the tokens is performed by identifying a part-of speech for the token.

7. The method of claim 6, wherein identification of the part-of speech for the token comprises identifying whether the token corresponds to a verb, noun, adjective, or adverb.

8. The method of claim 7, wherein the token that corresponds to a verb is categorized in an action category, the token that corresponds to a noun is categorized in a things category, the token that corresponds to an adjective is categorized in a description category, and the token that corresponds to an adverb is categorized in the description category.

9. The method of claim 2, wherein multiple items that correspond to a common lexical stem are categorized together.

10. The method of claim 1, wherein the snippets for the selected subset of the semantic analysis results is are analyzed.

11. The method of claim 1, wherein the semantic analysis comprises latent semantic analysis (LSA).

12. The method of claim 1, wherein the semantic analysis identifies themes or topics within the content.

13. The method of claim 12, wherein identifying, for the selected subset of the semantic analysis results, a frequency of terms is performed upon an aspect for the semantic analysis.

14. The method of claim 13, wherein a dashboard is presented in the user interface to allow selection of a portion of the semantic analysis results to select for identifying, for the selected subset of the semantic analysis results, a frequency of terms.

15. The method of claim 1, wherein the user interface displays a list of terms that most frequently appears in the content.

16. The method of claim 15, wherein the user interface displays the list of terms comprises different visual appearance for the terms to visually differentiate frequency levels for the terms.

17. The method of claim 15, wherein the user interface comprises a relatively larger font size for higher frequency terms and a relatively smaller font size for lower frequency terms.

18. A non-transitory computer readable medium having stored thereon a sequence of instructions which, when executed by a processor causes the processor to execute a method comprising:

receiving content from one or more sources;

performing semantic analysis upon the content from the one or more sources to generate semantic analysis results;

displaying the semantic analysis results for a topic of interest in a first graphical user interface on a display device, the first graphical user interface comprising a selectable user interface component such that different portions from the selectable user interface component corresponds to different subsets of the semantic analysis results;

receiving a user input through the first graphical user interface corresponding to selection of at least one portion of the selectable user interface component to initiate a drill down analysis for a selected subset of the semantic analysis results;

identifying, for the selected subset of semantic analysis results on the first user interface, a frequency of terms identified within the content received from one or more sources to generate the semantic analysis results;

generating snippets for the selected subset of the semantic analysis results on the first user interface by removing at least one or more portions of the content, the one or more portions removed to establish a specified number of content items centered around an item within the content, and storing the snippets in a database in a tangible computer readable storage device;

displaying the frequency of terms within a first portion of a second graphical user interface on a display device such that displayed items in the first portion of the second graphical user interface have different visual appearances to visually differentiate frequency levels for the displayed items, the different visual appearances proportional to the frequency levels for the displayed items, the different visual appearances comprising at least one of a size, a shade, or a color;

displaying snippets within a second portion of the second graphical user interface on the display device, receiving a user input through the second graphical user interface corresponding to selection of one item from the displayed items in the first portion of the second graphical user interface; and configuring the second portion to display a subset of the set of snippets, the subset of the snippets corresponding to the one item selected using the user input in the second graphical user interface.

19. The non-transitory computer readable medium of claim 18, wherein identifying a frequency of terms comprises:

sampling from the content;

tokenizing the sampled content into tokens;

categorizing the tokens; and processing the categorized tokens to generate the user interface.

20. The non-transitory computer readable medium of claim 19, wherein sampling comprises randomly extracting a specified number of data from the content.

21. The non-transitory computer readable medium of claim 19, wherein tokenizing is performed by using a language-specific tokenizer or filtering stop words from the tokens.

22. The non-transitory computer readable medium of claim 19, wherein categorization of the tokens is performed by identifying a part-of speech for the token.

23. The non-transitory computer readable medium of claim 22, where identification of the part-of speech for the token comprises identifying whether the token corresponds to a verb, noun, adjective, or adverb, and wherein the token that corresponds to a verb is categorized in an action category, the token that corresponds to a noun is categorized in a things category, the token that corresponds to an adjective is categorized in a description category, and the token that corresponds to an adverb is categorized in the description category.

24. The non-transitory computer readable medium of claim 19, wherein multiple items that correspond to a common lexical stem are categorized together.

25. The non-transitory computer readable medium of claim 18, wherein the snippets for the selected subset of the semantic analysis results are analyzed.

26. The non-transitory computer readable medium of claim 18, wherein the semantic analysis identifies themes or topics within the content.

27. The non-transitory computer readable medium of claim 18, wherein the identifying, for the selected subset of the semantic analysis results, a frequency of terms is performed upon an aspect for the semantic analysis.

28. The non-transitory computer readable medium of claim 27, wherein a dashboard is presented in the user interface to allow selection of a portion of the semantic analysis results to select for identifying, for the selected subset of the semantic analysis results, a frequency of terms.

29. The non-transitory computer readable medium of claim 18, wherein the user interface displays a list of terms that most frequently appears in the content.

30. The non-transitory computer readable medium of claim 29, wherein the user interface displays the list of terms comprises different visual appearance for the terms to visually differentiate frequency levels for the terms.

31. The non-transitory computer readable medium of claim 30, wherein the user interface comprises a relatively larger font size for higher frequency terms and a relatively smaller font size for lower frequency terms.

32. A system, comprising:

a processor;

a memory comprising computer code executed using the processor, in which a computer code implements:

receiving content from one or more sources;

performing semantic analysis upon the content from the one or more sources to generate semantic analysis results;

displaying the semantic analysis results for a topic of interest in a first graphical user interface on a display device, the first graphical user interface comprising a selectable user interface component such that different portions from the selectable user interface component corresponds to different subsets of the semantic analysis results;

receiving a user input through the first graphical user interface corresponding to selection of at least one portion of the selectable user interface component to initiate a drill down analysis for a selected subset of the semantic analysis results;

identifying, for the selected subset of semantic analysis results on the first user interface, a frequency of terms identified within the content received from one or more sources to generate the semantic analysis results;

generating snippets for the selected subset of the semantic analysis results on the first user interface by removing at least one or more portions of the content, the one or more portions removed to establish a specified number of content items centered around an item within the content, and storing the snippets in a database in a tangible computer readable storage device;

displaying the frequency of terms within a first portion of a second graphical user interface on a display device such that displayed items in the first portion of the second graphical user interface have different visual appearances to visually differentiate frequency levels for the displayed items, the different visual appearances proportional to the frequency levels for the displayed items, the different visual appearances comprising at least one of a size, a shade, or a color;

displaying snippets within a second portion of the second graphical user interface on the display device, receiving a user input through the second graphical user interface corresponding to selection of one item from the displayed items in the first portion of the second graphical user interface; and configuring the second portion to display a subset of the set of snippets, the subset of the snippets corresponding to the one item selected using the user input in the second graphical user interface.

33. The system of claim 32, wherein identifying a frequency of terms comprises sampling from the content; tokenizing the sampled content into tokens; categorizing the tokens; and processing the categorized tokens to generate the user interface.

34. The system of claim 33, wherein sampling comprises randomly extracting a specified number of data from the content.

35. The system of claim 33, wherein tokenizing is performed by using a language-specific tokenizer or by filtering stop words from the tokens.

36. The system of claim 33, wherein categorization of the tokens is performed by identifying a part-of speech for the token.

37. The system of claim 36, where identification of the part-of speech for the token comprises identifying whether the token corresponds to a verb, noun, adjective, or adverb, and wherein the token that corresponds to a verb is categorized in an action category, the token that corresponds to a noun is categorized in a things category, the token that corresponds to an adjective is categorized in a description category, and the token that corresponds to an adverb is categorized in the description category.

38. The system of claim 32, wherein multiple items that correspond to a common lexical stem are categorized together.

39. The system of claim 32, wherein the snippets for the selected subset of the semantic analysis results are analyzed.

40. The system of claim 32, wherein the semantic analysis identifies themes or topics within the content.

41. The system of claim 40, wherein identifying, for the selected subset of the semantic analysis results, a frequency of terms is performed upon an aspect for the semantic analysis.

42. The system of claim 41, wherein a dashboard is presented in the user interface to allow selection of a portion of the semantic analysis results to select for identifying, for the selected subset of the semantic analysis results, a frequency of terms.

43. The system of claim 32, wherein the user interface displays a list of terms that most frequently appears in the content.

44. The system of claim 43, wherein the user interface displays the list of terms comprises different visual appearance for the terms to visually differentiate frequency levels for the terms.

45. The system of claim 44, wherein the user interface comprises a relatively larger font size for higher frequency terms and a relatively smaller font size for lower frequency terms.

* * * * *